United States Patent
Ikeda

[11] Patent Number: 6,076,861
[45] Date of Patent: Jun. 20, 2000

[54] HOUSING TYPE PIPE COUPLING

[75] Inventor: Shintaro Ikeda, Kusatsu, Japan

[73] Assignee: The Victaulic Co., of Japan, Ltd., Tokyo, Japan

[21] Appl. No.: 09/111,744

[22] Filed: Jul. 8, 1998

Related U.S. Application Data

[63] Continuation-in-part of application No. 09/039,244, Mar. 16, 1998, abandoned.

[30] Foreign Application Priority Data

Dec. 25, 1997 [JP] Japan .................................. 9-358088

[51] Int. Cl.[7] ..................................................... F16L 17/04
[52] U.S. Cl. ........................... 285/112; 285/367; 285/373
[58] Field of Search ................................... 285/112, 373, 285/363, 366, 367, 410

[56] References Cited

U.S. PATENT DOCUMENTS

| | | | |
|---|---|---|---|
| 3,756,629 | 9/1973 | Gibb .......................................... | 285/416 |
| 5,058,931 | 10/1991 | Bowsher .................................. | 285/112 |
| 5,121,946 | 6/1992 | Jardine ..................................... | 285/373 |
| 5,246,257 | 9/1993 | Kojima et al. ........................... | 285/112 |

FOREIGN PATENT DOCUMENTS

| | | | |
|---|---|---|---|
| 2227065 | 7/1990 | United Kingdom ................... | 285/112 |
| 94/03751 | 2/1994 | WIPO .................................... | 285/112 |

*Primary Examiner*—Eric K. Nicholson
*Attorney, Agent, or Firm*—Jacobson, Price, Holman & Stern, PLLC

[57] ABSTRACT

Each of the circular coupling segments 20 has pipe fastening parts 24, 25. One pipe fastening part 24 has a protrusion 26 to be in contact with the side surface 3a of the circumferential groove 3 of one pipe 4 nearer to the end of the pipe 4 in one of the end sections thereof with respect to a circumferential direction, and a protrusion 27 to be in contact with the side surface 3b of the circumferential groove 3 of the pipe 4 farther from the end of the pipe 4 in the other end section thereof with respect to the circumferential direction. The other pipe fastening part 25 has a protrusion 28 to be in contact with the side surface 3b of the circumferential groove 3 of the pipe 5 farther from the end of the pipe 5 in one of the end sections thereof with respect to the circumferential direction, and a protrusion 29 to be in contact with the side surface 3a of the circumferential groove 3 of the pipe 5 nearer to the end of the pipe 5 in the other end section thereof with respect to the circumferential direction.

19 Claims, 10 Drawing Sheets

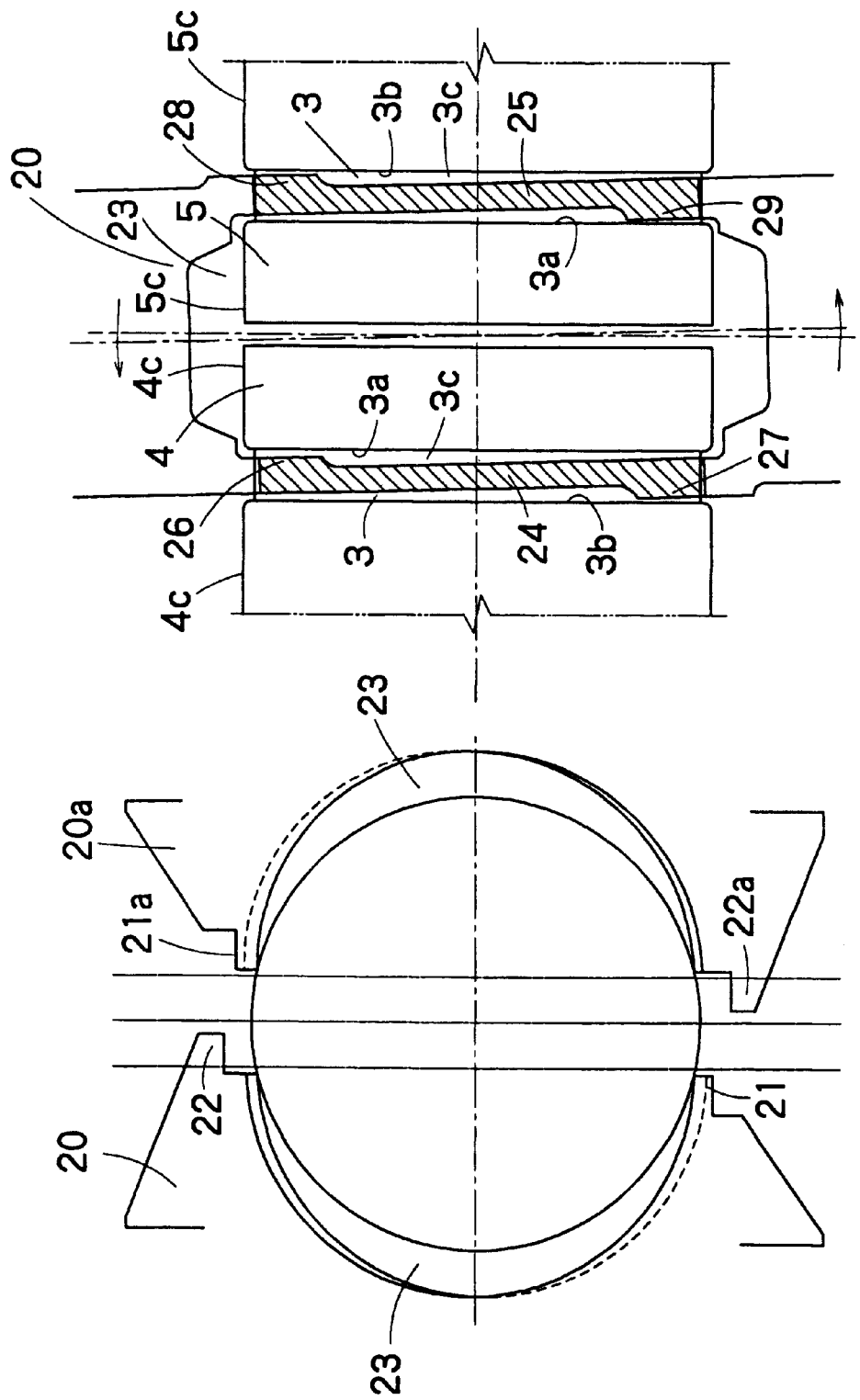

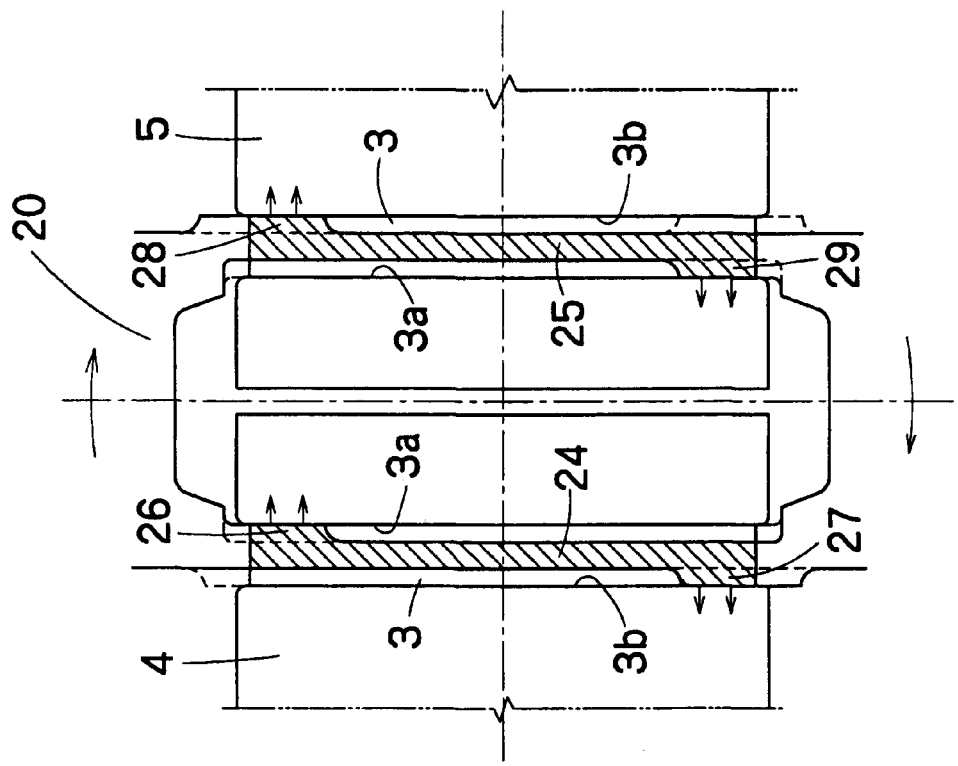
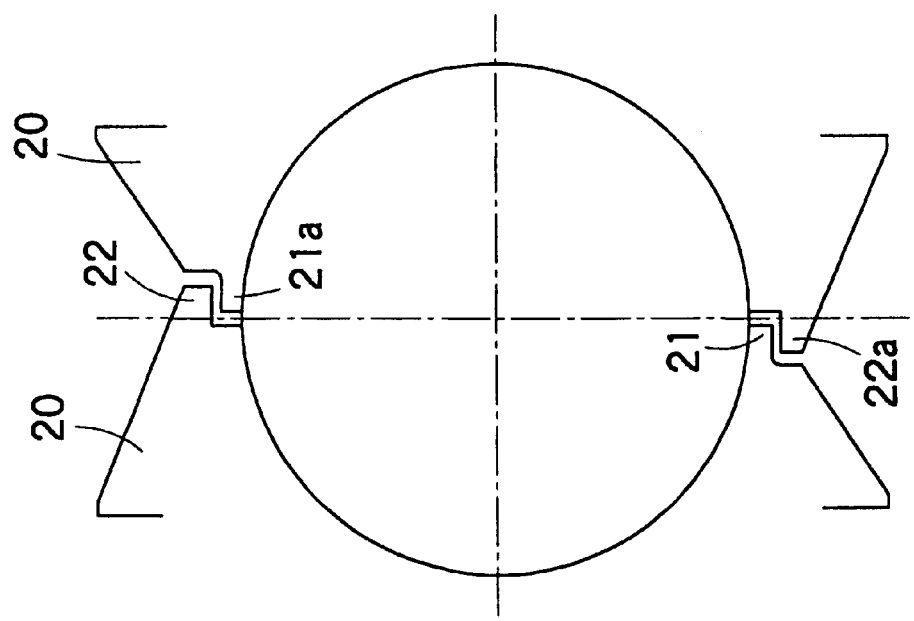
FIG. 4(b)
FIG. 4(a)

HOUSING TYPE PIPE COUPLING

This is a CIP application of U.S. Ser. No. (09/039,244) filed on Mar. 16, 1998 now abandoned.

TECHNICAL FIELD

The present invention relates to a housing type pipe coupling for creating a nonleaking union between ends of a pair of pipes butting each other.

BACKGROUND ART

A housing type pipe coupling as shown in FIG. 6 is used widely in industries for creating a nonleaking union between ends of adjacent pipes butting each other.

This known housing type pipe coupling comprises a pair of circular coupling segments 1 and 2 each having a shape substantially resembling a circular arc and each provided with a circular space 6 for receiving end parts of pipes 4 and 5 provided, respectively, with circumferential grooves 3, and fastening walls 8 and 9 formed on the opposite sides of the circular space 6 and capable of being fitted in the circumferential grooves 3 of the pipes 4 and 5, a sealing elastic ring 7 to be disposed in the circular spaces 6 to create a nonleaking union between the ends of the pipes 4 and 5, and fastening means 10 for fastening together the two circular coupling segments 1 and 2.

This housing type pipe coupling compresses the elastic sealing ring 7 placed in the circular spaces 6 of the circular coupling segments 1 and 2 on the outer circumferences of the end parts of the two pipes 4 and 5 to create a nonleaking union between the ends of the pipes 4 and 5, and fixes the circular coupling segments 1 and 2 to the pipes 4 and 5 by pressing the circular fastening walls 8 and 9 against a bottom of the circumferential grooves 3 formed in the end parts of the two pipes 4 and 5.

In this housing type pipe coupling, the circular fastening walls of the circular coupling segments must be formed in dimensions such that the inner circumferences of the circular fastening walls can be pressed against the bottoms of the circumferential grooves formed in the end parts of the pipes. However, pipes of the same nominal diameter have different diameters, and the circumferential grooves are often formed in different depths, so that the pressure exerted by the circular fastening walls on the bottom surfaces of the circumferential grooves is often not constant. Consequently, it is possible that the circular fastening walls are not fastened firmly to the pipes, the end parts of the two pipes cannot be firmly joined together, the end parts of the two pipes extend, contract or bend, or the elastic sealing ring is distorted in the circular spaces.

DISCLOSURE OF THE INVENTION

The present invention has been made in view of the foregoing problems and it is therefore an object of the present invention to provide a housing type pipe coupling capable of surely fastening together ends of adjacent pipes and of preventing an elastic ring disposed in a space thereof from being distorted even if the depth of circumferential grooves formed in end parts of the adjacent pipes are different from a prescribed depth.

According to one aspect of the present invention, a housing type pipe coupling comprises: a pair of circular coupling segments each having a space for receiving end parts of two pipes each provided with a circumferential groove defined by at least, a side surface nearer to the end of the pipe and a side surface farther from the end of the pipe; a sealing elastic ring placed in the space defined by the pair of circular coupling segments to create a nonleaking union between the ends of the two pipes; and fastening means for fastening together the pair of circular coupling segments. In this housing type pipe coupling, each of the circular coupling segments has pipe fastening parts respectively on the opposite sides of the space, the pipe fastening parts have opposite end sections with respect to a circumferential direction, and extend radially inward into the circumferential grooves of the two pipes, respectively, one of the pipe fastening parts of the circular coupling segment has a protrusion to be in contact with the side surface of the circumferential groove of one of the pipes nearer to the end of the same pipe in one of the end sections thereof with respect to a circumferential direction, and a protrusion to be in contact with the side surface of the circumferential groove of the same pipe farther from the end of the same pipe in the other end section thereof with respect to the circumferential direction, and the other pipe fastening part of the same circular coupling segment has a protrusion to be in contact with the side surface of the circumferential groove of the other pipe farther from the end of the same pipe in one of the end sections thereof with respect to the circumferential direction, and a protrusion to be in contact with the side surface of the circumferential groove of the same pipe nearer to the end of the same pipe in the other end section thereof with respect to the circumferential direction. The protrusions formed in the pipe fastening parts are pressed against the side surfaces of the circumferential grooves of the pipes to fasten surely together the end parts of the pipes to prevent the end parts of the pipes from extending, contracting or bending, and to prevent the elastic sealing ring from being distorted in the space.

According to another aspect of the present invention, a housing type pipe coupling comprises: a pair of circular coupling segments each having a space for receiving end parts of two pipes each provided with a circumferential rib having a side surface nearer to the end of the pipe and a side surface farther from the end of the pipe; a sealing elastic ring placed in the space defined by the pair of circular coupling segments to create a nonleaking union between the ends of the two pipes; and fastening means for fastening together the pair of circular coupling segments. In this housing type pipe coupling, each of the circular coupling segments has pipe setting parts respectively on the opposite sides of the space, the pipe setting parts have recesses for receiving the circumferential ribs of the pipes, the recess has a pair of side surfaces having, opposite end sections with respect to a circumferential direction, the recess of one of the pipe setting parts of the circular coupling segment has a protrusion to be in contact with the side surface of the circumferential rib of one of the pipes farther from the end of the same pipe in one of end sections thereof with respect to the circumferential direction, and a protrusion to be in contact with the side surface of the circumferential rib of the same pipe nearer to the end of the same pipe in the other end section thereof with respect to the circumferential direction, and the recess of the other pipe setting part of the same circular coupling segment has a protrusion to be in contact with the side surface of the circumferential rib of the other pipe nearer to the end of the same pipe in one of the end sections thereof with respect to the circumferential direction, and a protrusion to be in contact with the side surface of the circumferential rib of the same pipe farther from the end of the same pipe in the other end section thereof with respect to the circumferential direction. The protrusions formed in the pipe setting parts are pressed against the side surfaces of the circumferential ribs of the pipes to fasten surely together the end parts of the pipes to prevent the end parts of the pipes from extending, contracting or bending, and to prevent the elastic sealing ring from being distorted in the space.

BRIEF DESCRIPTION OF THE DRAWINGS

FIG. 3(a) is a fragmentary side view of the housing type pipe coupling of the present invention in a state before he housing type pipe coupling is fastened to pipes;

FIG. 3(b) is a schematic sectional view of the housing type pipe coupling of the present invention in a state before the housing type pipe coupling is fastened to pipes;

FIG. 4(a) is a fragmentary side view of the housing type pipe coupling of the present invention in a state after the housing type pipe coupling has been fastened to pipes;

FIG. 4(b) is a schematic sectional view of the housing type pipe coupling of the present invention in a state after the housing type pipe coupling has been fastened to pipes;

BEST MODE FOR CARRYING OUT THE INVENTION

Figure 1:
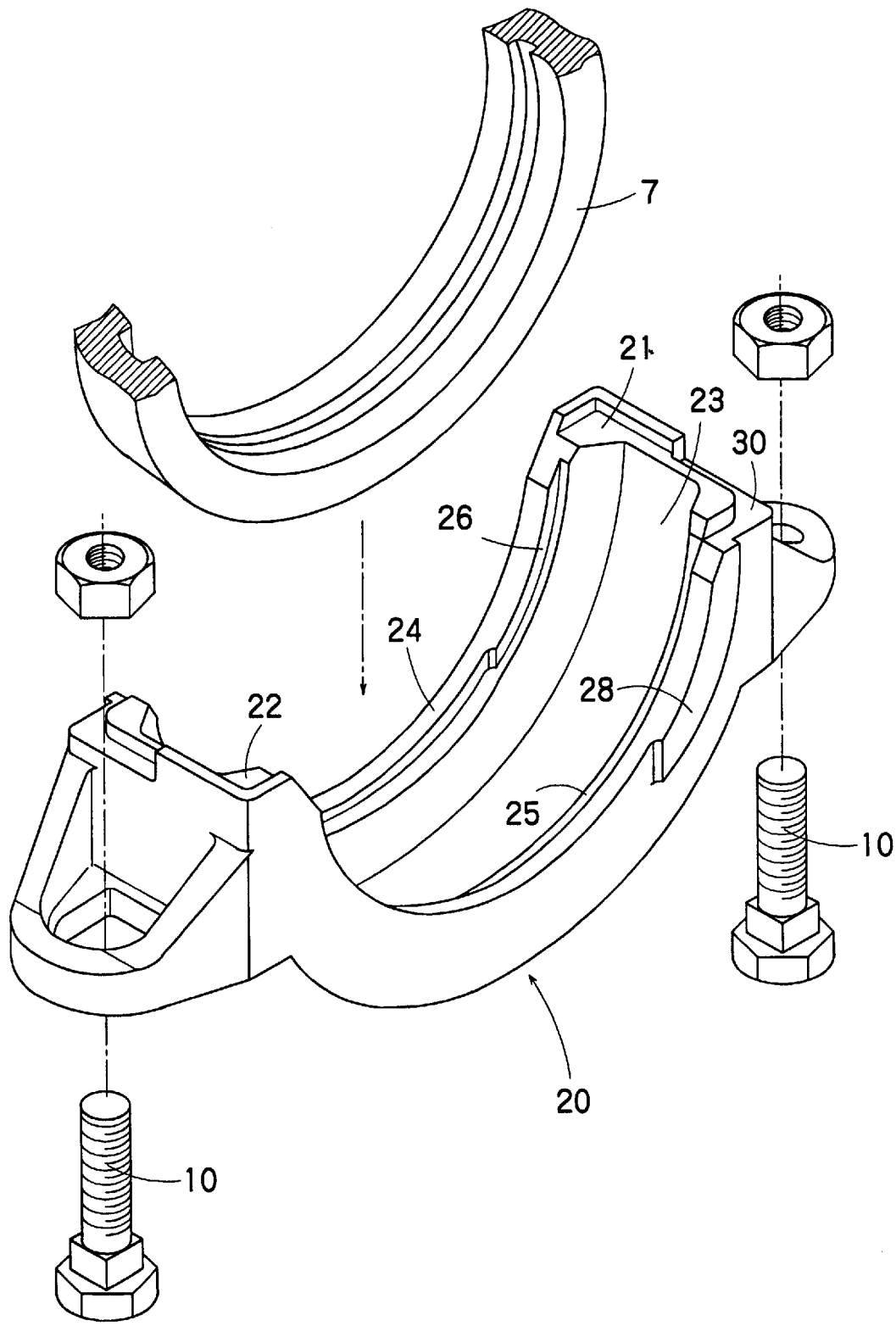
FIG. 1 is a perspective view of a circular coupling segments included in a housing type pipe coupling in a first embodiment according to the present invention.

Preferred embodiments of the present invention will be described hereinafter with reference to the accompanying drawings.

A housing type pipe coupling of the present invention has a pair of circular coupling segments 20 and 20a of the same shape substantially resembling a circular arc, and hence the single circular coupling segment 20 shown in FIG. 1 will be described.

The circular coupling segment 20 has joining parts 21 and 22 at the opposite end surfaces thereof with respect to a circumferential direction to be joined to the corresponding joining parts of the circular coupling segment 20a (FIG. 3(a)) in a socket-and-spigot joint. When joining together the circular coupling segments 20 and 20a, the joining parts 21 and 22 of the circular coupling segment 20 and the joining parts 22 and 21 of the circular coupling segment 20a are joined together, respectively, in a spigot-and-socket joint and the circular coupling segments 20 and 20a are fastened together with ordinary fastening members 10, such as bolts and nuts.

Figure 7:
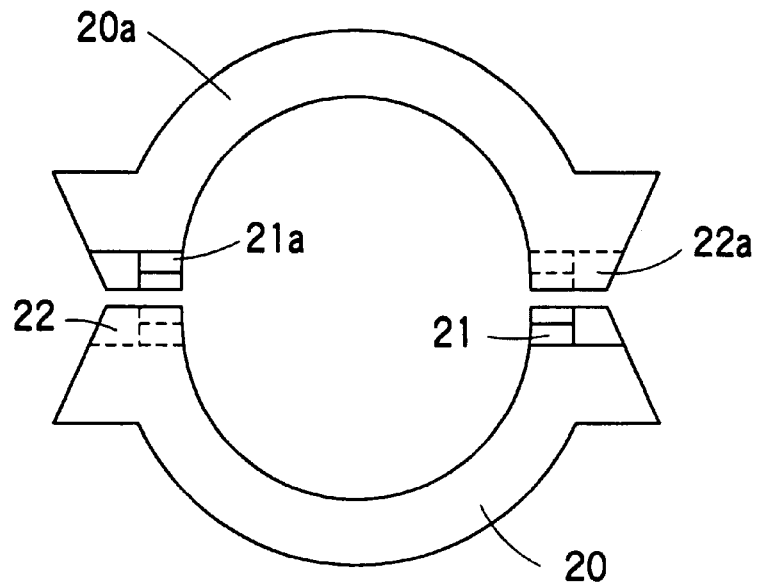
FIG. 7 is a front view of the housing type pipe coupling in a socket-and-spigot by a pair of segments of FIG. 1.
Figure 8:
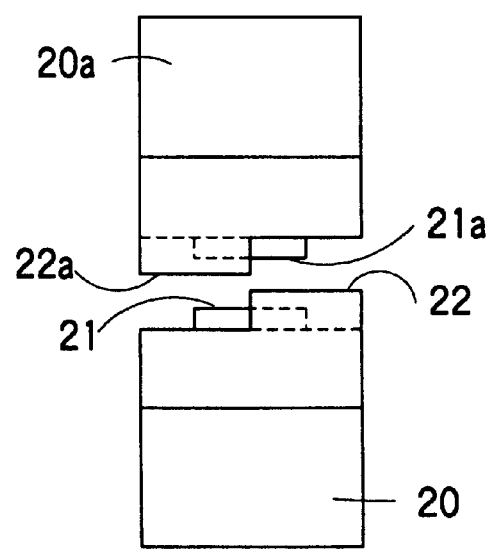
FIG. 8 is a side view of the housing type pipe coupling of FIG. 7.

As shown in FIGS. 7 and 8, the socket-and-spigot joint is constituted by a convex joining part 21 formed on each circumferential end surface of the circular coupling segment 20 in one half area thereof with respect to a width of the segment, a concave joining part 22 formed on the same end surface of the circular coupling segment 20 in the other half area thereof, a convex joining part 21a formed on each circumferential end surface of the circular coupling segment 20a in the other half area thereof and a concave joining part 22a formed on the same end surface of the circular coupling segment 20a in the one half area thereof, and is assembled by respectively engaging the convex joining part 21 and the concave joining part 22 of the circular coupling segment 20 with the concave joining part 22a and the convex joining part 21a of the circular coupling segment 20a.

Figure 2:
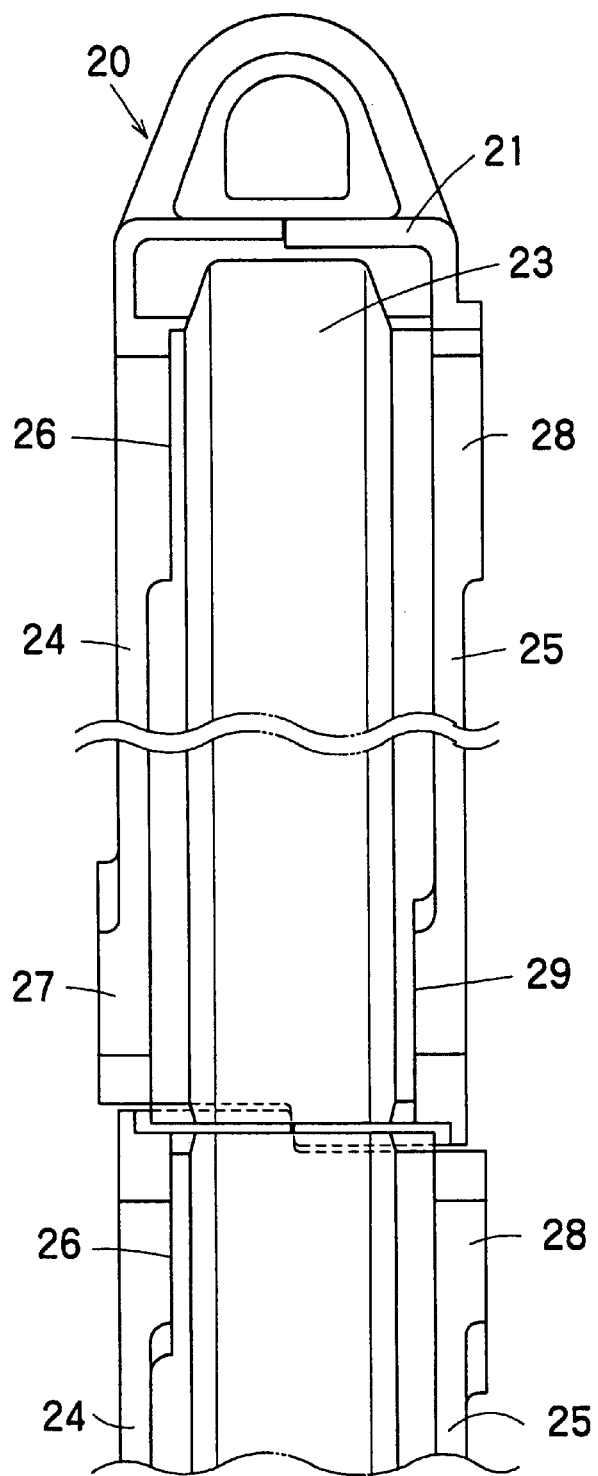
FIG. 2 is a fragmentary development of the circular coupling segment of FIG. 1.

As shown in FIGS. 1 and 2, the circular coupling segment 20 has a space 23 for receiving end parts of pipes 4 and 5 each provided with a circumferential groove 3, and a sealing elastic ring 7 for surrounding the end parts of the pipes 4 and 5. A pipe fastening part 24 protrudes radially inward from one of side walls defining the space 23. As shown in FIG. 3(b), the pipe fastening part 24 is fitted in the circumferential groove 3 of the pipe 4 to fix the end part of the pipe 4 to the circular coupling segment 20. A pipe fastening part 25 protrudes radially inward from the other side wall defining the space 23. As shown in FIG. 3(b), the pipe fastening part 25 is fitted in the circumferential groove 3 of the other pipe 5 to fix the end part of the pipe 5 to the circular coupling segment 20.

As shown in FIG. 1, the pipe fastening part 24 has an end surface of a fixed radius of curvature extending from one end section with respect to a circumferential direction end section with respect to a circumferential direction (an upper end in FIG. 2) to the other end section (a lower end in FIG. 2). As shown in FIGS. 1 to 3(b), the pipe fastening part 24 is provided on the inner surface of one end section thereof with a circular protrusion 26 to be in contact with a side surface 3a of the circumferential groove 3 formed in the end part of the pipe 4 and nearer to the end of the pipe 4, and on the outer surface of the other end section thereof with a circular protrusion 27 to be in contact with a side surface 3b of the circumferential groove 3 formed in the end part of the pipe 4 and farther from the end of the pipe 4. As shown in FIG. 1, the circular protrusions 26 and 27 may extend continuously or discontinuously to a position at an angular distance of 45° from a joining surface 30. Experiments proved that it is desirable that the circular protrusions 26 and 27 are pressed against the side surfaces of the circumferential groove at a position at an angular distance of about 45° from the joining surface 30.

In the circular coupling segment 20 shown in FIG. 1, the circular protrusions extend continuously to a position at an angular distance of about 45° from the joining surface 30.

The pipe fastening part may extend in a uniform slope, from an extremity at the angular distance of about 45° of the protrusion extending continuously from one end of the same pipe fastening part with respect to the circumferential direction to the position at the angular distance of about 45°, to the other end of the same pipe fastening part with respect to the circumferential direction.

The protrusion formed on the pipe fastening part may be formed by a projection element provided at an angular distance of about 45° from one or the other end of the same pipe fastening part with respect to the circumferential direction.

The pipe fastening part 25, similarly to the pipe fastening part 24, has an end surface of a fixed radius of curvature extending from one end section with respect to a circumferential direction (an upper end in FIG. 2) to the other end section (a lower end in FIG. 2). As shown in FIGS. 1 to 3(b), the pipe fastening part 25 is provided on the outer surface of one end section thereof with a circular protrusion 28 to be in contact with a side surface 3b of the circumferential groove 3 formed in the end part of the other pipe 5 and farther from the end of the pipe 5, and on the inner surface of the other end section thereof with a circular protrusion 29 to be in contact with a side surface 3a of the circumferential groove 3 formed in the end part of the pipe 5 and nearer to the end of the pipe 4. The circular protrusions 28 and 29, similarly to the circular protrusions 26 and 27, extend to a position at an angular distance of 45° from the joining surface 30. Although it is preferable that the circular protrusions 28 and 29 extend continuously to the position at an angular distance of about 45° from the joining surface 30, the same may extend discontinuously. Experiments proved that it is desirable that the circular protrusions 28 and 29 are pressed against the side surfaces of the circumferential groove at a position at an angular distance of about 45° from the joining surface 30.

In the circular coupling segment 20 shown in FIG. 1, the circular protrusions extend continuously to a position at an angular distance of about 45° from the joining surface 30.

The pipe fastening part may extend in a uniform slope, from an extremity at the angular distance of about 45° of the protrusion extending continuously from one end of the same pipe fastening part with respect to the circumferential direction to the position at the angular distance of about 45°, to the other end of the same pipe fastening part with respect to the circumferential direction.

The protrusion formed on the pipe fastening part may be formed by a projection element provided at an angular distance of about 45° from one or the other end of the same pipe fastening part with respect to the circumferential direction.

When assembling the housing type pipe coupling, the circular coupling segments 20 and 20a are disposed so that the joining parts 21 and 22 of the circular coupling segment 20 are opposite to the joining parts 22a and 21a of the circular coupling segment 20a, respectively, and then the joining parts 21 and 22 of the circular coupling segment 20 are mated with the joining parts 22a and 21a of the circular coupling segment 20a, respectively.

A procedure for assembling the housing type pipe coupling will be explained hereinafter.

A liquid-tight pipe assembly is formed by inserting the end parts of the pipes 4 and 5 through the opposite ends of the sealing elastic ring 7 in the sealing elastic ring 7 so that the respective ends of the pipes 4 and 5 butt each other in the sealing elastic ring 7.

The pipe assembly is set in the circular coupling segment 20 with the sealing elastic ring 7 disposed in the space 23. In FIG. 3(a), the elastic ring is omitted to facilitate understanding.

The circular coupling segment 20a is disposed so that the joining parts 21a and 22a thereof are opposite to the joining parts 22 and 21 of the circular coupling segment 20, respectively, as shown in FIG. 3(a), and then the circular coupling segments 20 and 20a are pressed against each other so that the joining parts 21a and 22a are mated with the joining parts 22 and 21, respectively.

In a state where the circular coupling segments 20 and 20a are not yet joined together, a section of the pipe fastening part 24 of the circular coupling segment 20 on the side of the circular protrusion 26 is in contact with the bottom surface 3c of the circumferential groove 3 of the pipe 4, a section of the pipe fastening part 24 of the circular coupling segment 20 on the side of the circular protrusion 27 is spaced from the bottom surface 3c of the circumferential groove 3 of the pipe 4, a section of the pipe fastening part 25 of the circular coupling segment 20 on the side of the circular protrusion 29 is in contact with the bottom surface 3c of the circumferential groove 3 of the pipe 4, a section of the pipe fastening part 25 of the circular coupling segment 20 on the side of the circular protrusion 28 is spaced from the bottom surface 3c of the circumferential groove 3 of the pipe 4, and the circular protrusions 26 and 27 of the pipe fastening part 24, and the circular protrusions 28 and 29 of the pipe fastening part 25 are spaced from the side surfaces 3a, 3b of the circumferential grooves 3 of the pipe 4 as shown in FIG. 3(b). Although the circular coupling segment 20a is not shown in FIG. 3(b), the pipe fastening parts of the circular coupling segment 20a are disposed opposite to those of the circular coupling segment 20, respectively.

Subsequently, the circular coupling segments 20 and 20a are fastened together with the ordinary fastening parts 10, such as bolts and nuts. Consequently, the joining parts 21 and 22 of the circular coupling segment 20 are mated with the joining parts 22a and 21a of the circular coupling segment 20a as shown in FIG. 4(a).

When the circular coupling segments 20 and 20a are fastened together in a state shown in FIG. 4(a), the circular coupling segment 20 turns in the direction of the arrows shown in FIG. 4(b), and the circular coupling segment 20a, not shown in FIG. 4(b), turns in the opposite direction of the arrows shown in FIG. 4(b).

When the circular coupling segments 20 and 20a are fastened together as shown in FIG. 4(a), the circular protrusion 26 of the pipe fastening part 24 of the circular coupling segment 20 is pressed against the side surface 3a of the circumferential groove 3 of the pipe 4 nearer to the end of the same pipe 4 to press the pipe 4 in the direction of the arrows shown in FIG. 4(b), i.e., in the direction toward the end of the pipe 4, and the circular protrusion 27 of the pipe fastening part 24 is pressed against the side surface 3b of the circumferential groove 3 of the pipe 4 farther from the end of the same pipe 4 to press the pipe 4 in the direction of the arrows shown in FIG. 4(b), i.e., in the direction away from the end of the pipe 4. At the same time, the circular protrusion 28 of the pipe fastening part 25 is pressed against the side surface 3b of the circumferential groove 3 of the pipe 5 farther from the end of the same pipe 5 to press the pipe 5 in the direction of the arrows, i.e., in the direction away from the end of the pipe 5, and the circular protrusion 29 of the pipe fastening part 25 is pressed against the side surface 3a of the circumferential groove 3 of the pipe 5 nearer to the end of the same pipe 5 to press the pipe 5 in the direction of the arrows, i.e., in the direction away from the end of the pipe 5.

The circular coupling segment 20a moves oppositely to the circular coupling segment 20, and hence the actions of circular protrusions of pipe fastening parts of the circular coupling segment 20a are reverse to those of the corresponding circular protrusions of the pipe fastening parts of the circular coupling segment 20, respectively.

Since the pipe fastening parts of the housing type pipe coupling, are pressed against the bottom surfaces and the side surfaces of the circumferential grooves formed in the end parts of the pipes, respectively, the ends of the pair of pipes 4 and 5 can be surely fastened together. Consequently, the end parts of the pair of pipes 4 and 5 are prevented from extending, contracting or bending in the housing type pipe coupling, and the sealing elastic ring 7 is prevented from being distorted in the space 23.

Although the housing type pipe coupling in this embodiment presses the pipe fastening parts against the bottom surfaces 3c and the side surfaces 3a and 3b of the circumferential grooves 3 formed in the end parts of the pipes 4 and 5, the pipe fastening parts may be pressed against the outer circumferences 4c and 5c of the pipes, and the side surfaces 3a and 3b of the circumferential grooves 3. If the pipe fastening parts are pressed against the outer circumferences 4c and 5c, and the side surfaces 3a and 3b of the circumferential grooves 3, the space between the pipes 4 and 5 and the bottom surface of the space 23 is always the same regardless of the depth of the circumferential grooves 3 of the pipes 4 and 5.

Figure 5:
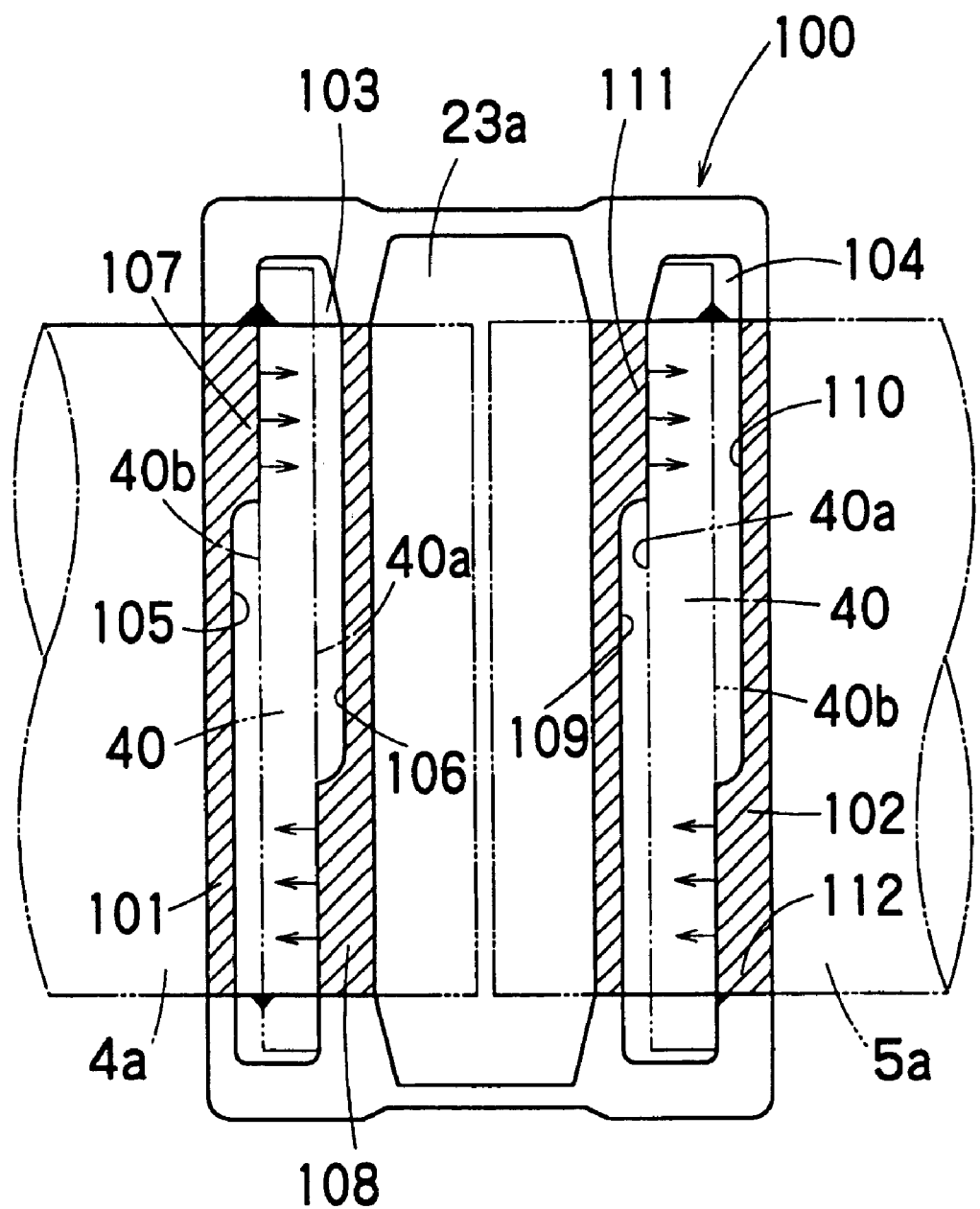
FIG. 5 is a sectional view of a housing type pipe coupling in a second embodiment according to the present invention.
Figure 6:
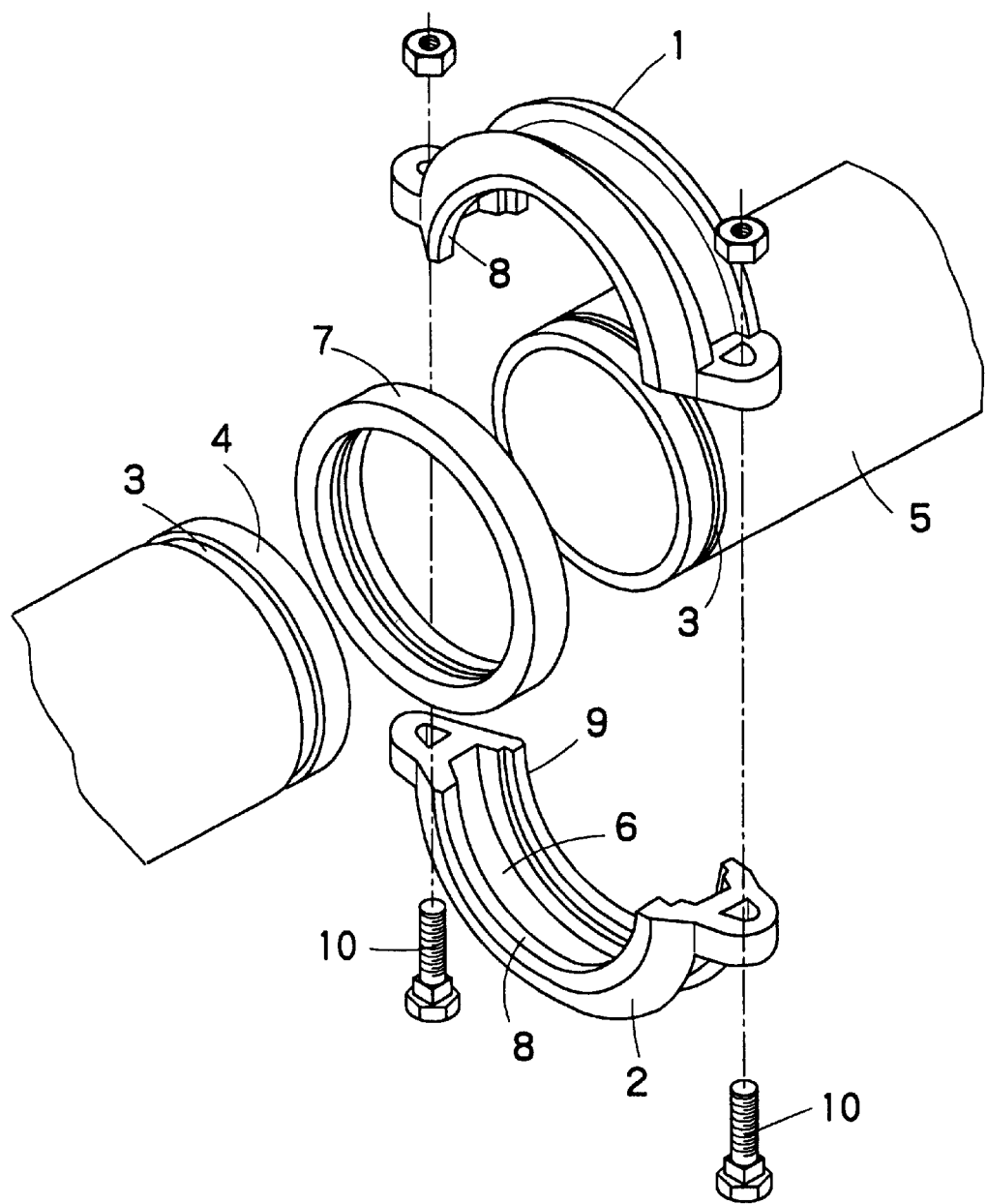
FIG. 6 is an exploded perspective view of a conventional housing type pipe coupling.

FIG. 5 shows a housing type pipe coupling in a second embodiment according to the present invention. This housing type pipe coupling is designed to couple two pipes 4a and 5a each provided with a circumferential rib 40 welded thereto.

Each of circular coupling segments 100 has a space 23a, and pipe setting parts 101 and 102 formed, respectively, on the opposite sides of the space 23a so as to be pressed against the outer circumferences of the pipes 4a and 5a. A recess 103 is formed at the pipe setting part 101 to receive the circumferential rib 40, and a recess 104 is formed at the pipe setting part 102 to receive the circumferential rib 40.

The recess 103 is defined by a pair of side surfaces 105 and 106. A circular protrusion 107 to be brought into contact with a side surface 40b of the circumferential rib 40 of the pipe 4a farther from the end of the pipe 4a is formed in a section of the side surface 105 on the side of one end section with respect to a circumferential direction, and a circular protrusion 108 to be brought into contact with a side surface 40a of the circumferential rib 40 of the pipe 4a nearer to the end of the pipe 4a is formed in a section of the side surface 106 on the side of the other end section with respect to the circumferential direction.

The recess 104 is defined by a pair of side surfaces 109 and 110. A circular protrusion 111 to be brought into contact with a side surface 40a of the circumferential rib 40 of the pipe 5a nearer to the end of the pipe 5a is formed in a section of the side surface 109 on the side of one end section with respect to the circumferential direction, and a circular protrusion 112 to be brought into contact with a side surface 40b of the circumferential rib 40 of the pipe 5a farther from the end of the pipe 5a is formed in a section of the side surface 110 on the side of the other end section with respect to the circumferential direction.

When the circular coupling segments 100 are joined together in a spigot-and-socket joint, the circular protrusion 107 formed on the side surface 105 of the recess 103 formed in the pipe setting part 101 is pressed against the side surface 40b of the circumferential rib 40 of the pipe 4a farther from the end of the pipe 4a to press the pipe 4a in the direction of the arrows, i.e., in the direction toward the end of the pipe 4a, and the circumferential protrusion 108 formed on the side surface 106 is pressed against the side surface 40a of the circumferential rib 40 of the pipe 4a nearer to the end of the pipe 4a to press the pipe 4a in the direction of the arrows, i.e., in the direction away from the end of the pipe 4a. At the same time, the circular protrusion 111 formed on the side surface 109 of the recess 104 formed in the pipe setting part 102 is pressed against the side surface 40a of the circumferential rib 40 of the pipe 5a nearer to the end of the pipe 5a to press the pipe 5a in the direction of the arrows, i.e., in the direction away from the end of the pipe 5a, and the circular protrusion 112 formed on the side surface 110 is pressed against the side surface 40b of the circumferential rib 40 of the pipe 5a farther from the end of the pipe 5a to press the pipe 5a in the direction of the arrows, i.e., in the direction toward the end of the pipe 4a.

Figure 9:
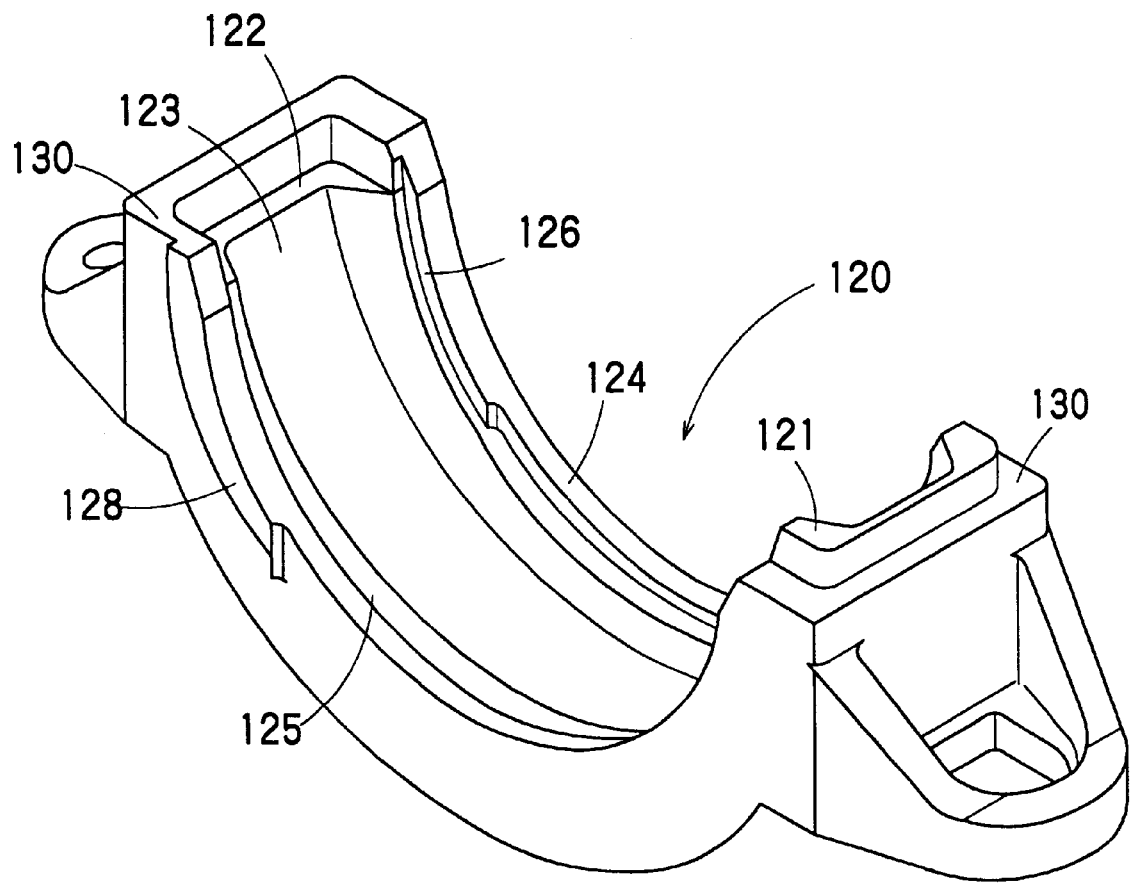
FIG. 9 is a perspective view of a circular coupling segments included in a housing type pipe coupling in a third embodiment according to the present invention.

FIG. 9 shows a circular coupling segment of the housing type pipe coupling according to a third embodiment of the present invention. A circular coupling segment 120a mated with the circular coupling segment 120 has the same structure, hence the single circular coupling segment 120 will be described.

The circular coupling segment 120 has a convex joining part 121 formed on one of circumferential end surfaces for socket-and-spigot joint, and a concave joining part 122 formed on the other circumferential end surface for the socket-and-spigot joint.

As shown in FIG. 9, the circular coupling segment 120 has a space 123 for receiving end parts of pipes 4 and 5 each provided with a circumferential groove 3, and a sealing elastic ring 7 for surrounding the end parts of the pipes 4 and 5. A pipe fastening part 124 protrudes radially inward from one of side walls defining the space 123. A pipe fastening part 125 protrudes radially inward from the other side wall defining the space 123.

Figure 10:
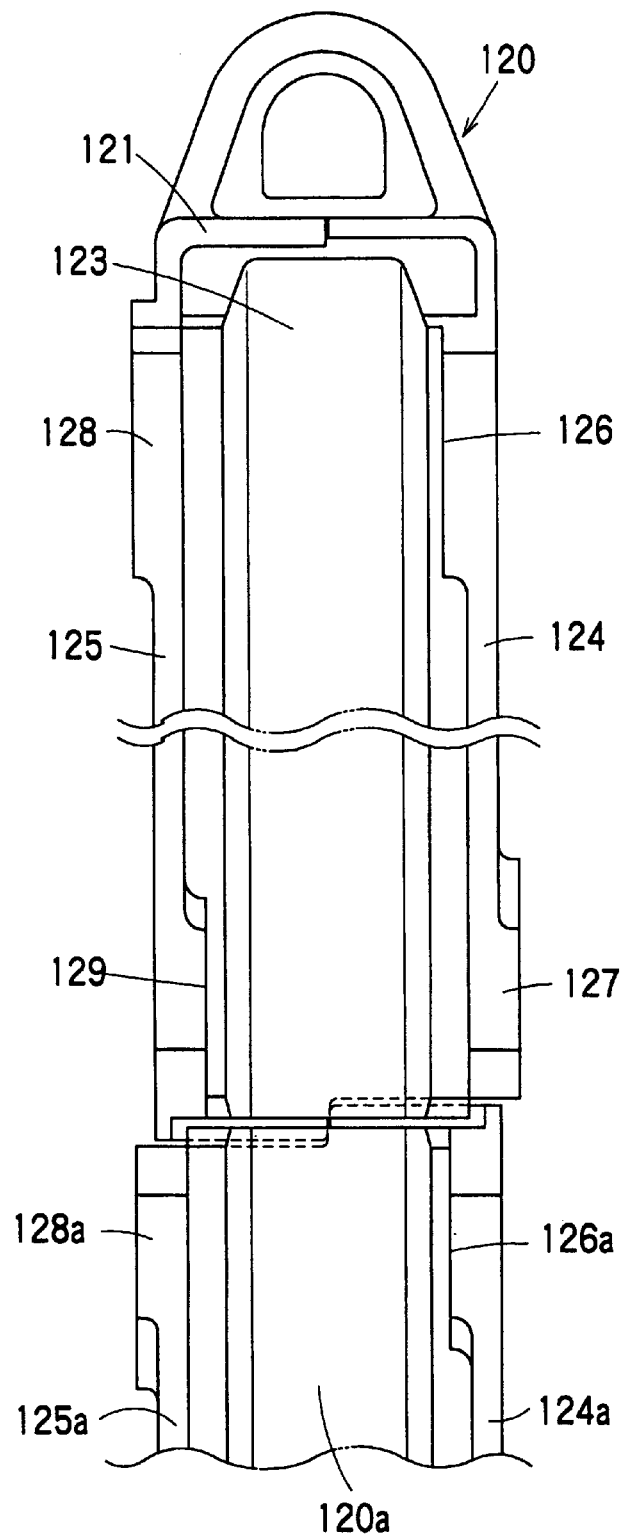
FIG. 10 is a fragmentary development of the circular coupling segment of FIG. 9.

As shown in FIGS. 9 and 10, the pipe fastening part 124 is provided on the inner surface of one end section thereof with a circular protrusion 126 to be in contact with a side surface 3a of the circumferential groove 3 formed in the end part of the pipe 4 and nearer to the end of the pipe 4, and on the outer surface of the other end section thereof with a circular protrusion 127 to be in contact with a side surface 3b of the circumferential groove 3 formed in the end part of the pipe 4 and farther from the end of the pipe 4. As shown in FIG. 9, the protrusions 126 and 127 may extend continuously or discontinuously to a position at an angular distance of 45° from a joining surface 30. Experiments proved that it is desirable that the circular protrusions 126 and 127 are pressed against the side surfaces of the circumferential groove at a position at an angular distance of about 45° from the joining surface 30.

As shown in FIGS. 9 and 10, the pipe fastening part 125 is provided on the outer surface of one end section thereof with a circular protrusion 128 to be in contact with a side surface 3b of the circumferential groove 3 formed in the end part of the other pipe 5 and farther from the end of the pipe 5, and on the inner surface of the other end section thereof with a circular protrusion 129 to be in contact with a side surface 3a of the circumferential groove 3 formed in the end part of the pipe 5 and nearer to the end of the pipe 4. Although the circular protrusions 128 and 129 extend continuously to the position at an angular distance of about 45° from the joining surface 30 in FIG. 9, the same may extend discontinuously. Experiments proved that it is desirable that the circular protrusions 128 and 129 are pressed against the side surfaces of the circumferential groove at a position at an angular distance of about 45° from the joining surface 30.

A procedure for assembling the above housing type pipe coupling will be explained hereinafter.

A liquid-tight pipe assembly is formed by inserting the end parts of the pipes 4 and 5 through the opposite ends of the sealing elastic ring 7 in the sealing elastic ring 7 so that the respective ends of the pipes 4 and 5 butt each other in the sealing elastic ring 7.

The pipe assembly is set in the circular coupling segment 120 with the sealing elastic ring 7 disposed in the space 123.

Figure 11:
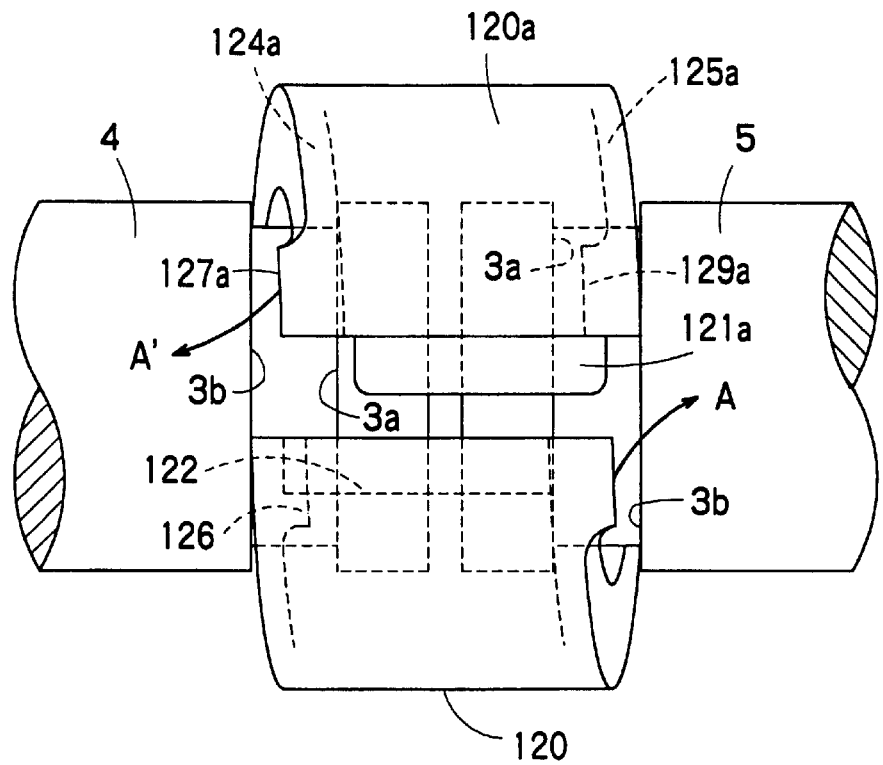
FIG. 11 is a fragmentary side view of the housing type pipe coupling of the third embodiment in a state that the housing type pipe coupling is being fastened to pipes.

The circular coupling segment 120a is disposed so that the convex joining part 121a and the concave joining part thereof are opposite to the concave joining part 122 and the convex joining part 121 of the circular coupling segment 120, respectively, as shown in FIG. 11, and then the circular coupling segments 120 and 120a are pressed against each other so that the convex joining part 121a and the concave joining part 122a are mated with the concave joining part 122 and the convex joining part 121, respectively.

In a state where the circular coupling segments 120 and 120a are not yet joined together, a section of the pipe fastening part 124 of the circular coupling segment 120 on the side of the circular protrusion 126 is in contact with the bottom surface 3c of the circumferential groove 3 of the pipe 4, a section of the pipe fastening part 124 of the circular coupling segment 120 on the side of the circular protrusion 127 is spaced from the bottom surface 3c of the circumferential groove 3 of the pipe 4, a section of the pipe fastening part 125 of the circular coupling segment 120 on the side of the circular protrusion 129 is in contact with the bottom surface 3c of the circumferential groove 3 of the pipe 4, a section of the pipe fastening part 125 of the circular coupling segment 120 on the side of the circular protrusion 128 is spaced from the bottom surface 3c of the circumferential groove 3 of the pipe 4, and the circular protrusions 126 and 127 of the pipe fastening part 124, and the circular protrusions 128 and 129 of the pipe fastening part 125 are spaced from the side surfaces 3a, 3b of the circumferential grooves 3 of the pipe 4. The pipe fastening parts 124a and 125a of the circular coupling segment 120a are disposed opposite to the pipe fastening parts 124 and 125 of the circular coupling segment 120, respectively.

Figure 12:
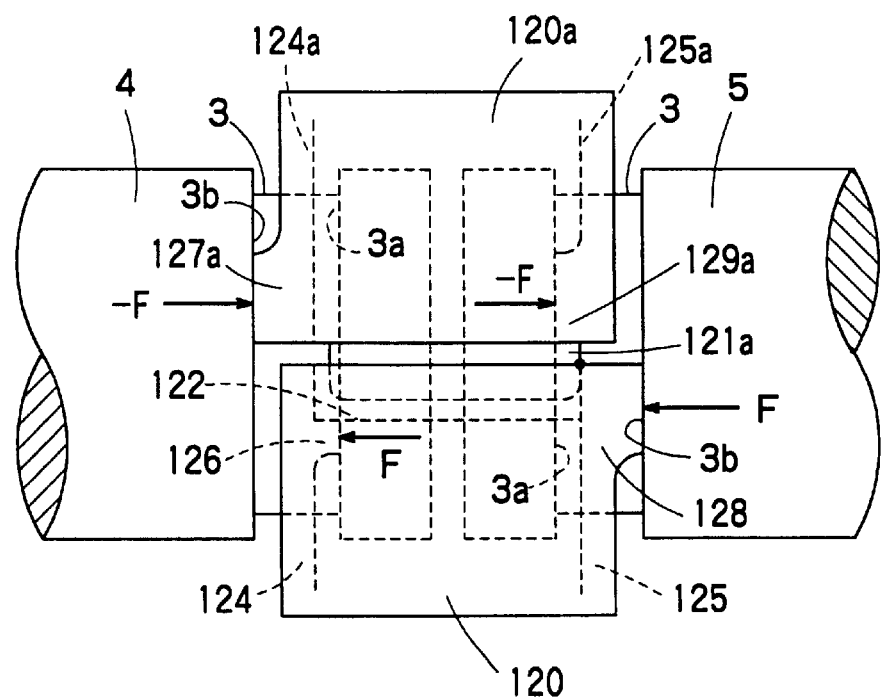
FIG. 12 is a fragmentary side view of the housing type pipe coupling of the third embodiment in a state after the housing type pipe coupling has been fastened to pipes.

As shown in FIG. 12, the circular coupling segment 120 and the circular coupling segment 120a are coupled in a socket-and-spigot joint by engaging the convex joining part 121 and the concave joining part 122 of the former with the concave joining part 122a and the convex joining part 121a of the latter, and are integrated by usual means, such as bolt-nut or the like.

In coupling the circular coupling segment 120 and the circular coupling segment 120a into the socket-and-spigot joint, by the use of bolt-nut mounting means 10, as shown in FIG. 11, the circular coupling segment 120 and the circular coupling segment 120a are turned respectively in the directions of the arrows A and A'.

When the socket-and-spigot joint of the circular coupling segments 120 and 120a is accomplished, as shown in FIG. 12, the convex joining part 121 of the circular coupling segment 120 and the concave joining part 122a of the circular coupling segment 120a are engaged with each other, and the concave joining part 122 of the circular coupling segment 120 and the convex joining part 121a of the circular coupling segment 120a are engaged with each other, so that the convex joining part 121 and the concave joining part 122a, and the convex joining part 121a and the concave joining part 122 respectively contact with each other at the point P, and even if there is an external force F or –F which may displace the pipes, the circular coupling segments 120 and 120a are not transversely displaced from each other with a force opposing the external force F or –F generated, which increases a fixing force for the pipes 4, 5.

As is apparent from the foregoing description, according to the present invention, the circular protrusions formed on the pipe fastening parts or the pipe setting parts are pressed against the side surfaces of the circumferential grooves of the pipes or the side surfaces of the circumferential ribs of the pipes to fasten surely together the pipes. The housing type pipe coupling is capable of preventing the end parts of the pipes from extending, contracting or bending in the housing type pipe coupling, of preventing the pipes from moving relative to each other and of preventing the sealing elastic ring from being distorted in the space.

I claim:

1. A housing type pipe coupling comprising:

a pair of semi-circular coupling segments each having a space for receiving end parts of two pipes each provided with a circumferential groove defined by at least a side surface nearer to the end of the pipe and a side surface farther from the end of the pipe;

a sealing elastic ring placed in the space defined by the pair of semi-circular coupling segments to create a nonleaking union between the ends of the two pipes; and fastening means for fastening together the pair of semi-circular coupling segments;

wherein each of the semi-circular coupling segments has pipe fastening parts respectively on the opposite sides of the space, the pipe fastening parts have opposite end sections with respect to a circumferential direction, and extend radially inward into the circumferential grooves of the two pipes, respectively, one of the pipe fastening parts of the semi-circular coupling segment has a protrusion to be in contact with the side surface of the circumferential groove of one of the pipes nearer to the end of the same pipe in one of the end sections thereof with respect to a circumferential direction, and a protrusion to be in contact with the side surface of the circumferential groove of the same pipe farther from the end of the same pipe in the other end section thereof with respect to the circumferential direction, and the other pipe fastening part of the same semi-circular coupling segment has a protrusion to be in contact with the side surface of the circumferential groove of the other pipe farther from the end of the same pipe in one of the end sections thereof with respect to the circumferential direction, and a protrusion to be in contact with the side surface of the circumferential groove of the same pipe nearer to the end of the same pipe in the other end section thereof with respect to the circumferential direction.

2. The housing type pipe coupling according to claim 1, wherein the protrusion formed on the pipe fastening part has an arc shape conforming to a shape of the circumferential groove of the pipe.

3. The housing type pipe coupling according to claim 2, wherein the protrusion formed on the pipe fastening part extends continuously from one or the other end of the same pipe fastening part with respect to the circumferential direction to a position at an angular distance of about 45° from one or the other end of the same pipe fastening part.

4. The housing type pipe coupling according to claim 3, wherein the pipe fastening part extends in a uniform slope, from an extremity at the angular distance of about 45° of the protrusion extending continuously from one or the other end of the same pipe fastening part with respect to the circumferential direction to the position at the angular distance of about 45°, to the latter or the former end of the same pipe fastening part with respect to the circumferential direction.

5. The housing type pipe coupling according to claim 1, wherein the protrusion formed on the pipe fastening part is formed by a projection elements provided at an angular distance of about 45° from one or the other end of the same pipe fastening part with respect to the circumferential direction.

6. The housing type pipe coupling according to claim 1, wherein the pair of semi-circular coupling segments are joined together in a socket-and-spigot joint.

7. The housing type pipe coupling according to claim 1, wherein the pipe fastening part comes into contact with a bottom surface of the circumferential groove of the pipe.

8. The housing type pipe coupling according to claim 1, wherein the pipe fastening part comes into contact with an outer circumference of the pipe.

9. A housing type pipe coupling comprising:

a pair of semi-circular coupling segments each having a space for receiving end parts of two pipes each provided with a circumferential rib having a side surface nearer to the end of the pipe and a side surface farther from the end of the pipe;

a sealing elastic ring placed in the space defined by the pair of semi-circular coupling segments to create a nonleaking union between the ends of the two pipes; and fastening means for fastening together the pair of semi-circular coupling segments;

wherein each of the semi-circular coupling segments has pipe setting parts respectively on the opposite sides of the space, the pipe setting parts have recesses for receiving the circumferential ribs of the pipes, the recess has a pair of side surfaces having opposite end sections with respect to a circumferential direction, the recess of one of the pipe setting parts of the semi-circular coupling segment has a protrusion to be in contact with the side surface of the circumferential rib of one of the pipes farther from the end of the same pipe in one of end sections thereof with respect to a circumferential direction, and a protrusion to be in contact with the side surface of the circumferential rib of the same pipe nearer to the end of the same pipe in the other end section thereof with respect to the circumferential direction, and the recess of the other pipe setting part of the same semi-circular coupling segment has a protrusion to be in contact with the side surface of the circumferential rib of the other pipe nearer to the end of the same pipe in one of the end sections thereof with respect to the circumferential direction, and a protrusion to be in contact with the side surface of the circumferential rib of the same pipe farther from the end of the same pipe in the other end section thereof with respect to the circumferential direction.

10. The housing type pipe coupling according to claim 9, wherein the protrusion formed in the recess has an arc shape conforming to a shape of the circumferential rib of the pipe.

11. The housing type pipe coupling according to claim 10, wherein the protrusion formed in the recess extends continuously from one or the other end of the same pipe setting part with respect to the circumferential direction to a position at an angular distance of about 45° from one or the other end of the same pipe setting parts.

12. The housing type pipe coupling according to claim 11, wherein the pipe setting part extends in a uniform slope, from an extremity at the angular distance of about 45° of the protrusion extending continuously from one or the other end of the same pipe setting part with respect to the circumferential direction to the position at the angular distance of about 45°, to the latter or the former end of the same pipe setting part with respect to the circumferential direction.

13. The housing type pipe coupling according to claim 9, wherein the protrusion formed in the recess is formed by a projection element provided at an angular distance of about 45° from one or the other end of the same pipe setting part with respect to the circumferential direction.

14. The housing type pipe coupling according to claim 9, wherein the pair of semi-circular coupling segments are joined together in a socket-and-spigot joint.

15. The housing type pipe coupling according to claim 9, wherein the pipe setting part comes into contact with an outer circumference of the circumferential rib of the pipe, respectively.

16. The housing type pipe coupling according to claim 9, wherein the pipe setting part comes into contact with an outer circumference of the pipe.

17. The housing type pipe coupling according to claim 6, wherein each of the semi-circular coupling segments has a pair of circumferential end surfaces, each of which includes a convex joining part in one half area of the circumferential end surface with respect to a width of the segment and a concave joining part in the other half area of the circumferential end surface, so that the convex joining part and the concave joining part of one segment can engage with the concave joining part and the convex joining part of the other segment respectively.

18. The housing type pipe coupling according to claim 6, wherein each of the semi-circular coupling segments has a pair of circumferential end surfaces, one of which has a convex joining part, the other of which has a concave joining part, so that the convex joining part and the concave joining part of one segment can engage with the concave joining part and the convex joining part of the other segment respectively.

19. The housing type pipe coupling according to claim 1, wherein the fastening means has a screw means and a screwing direction of the screw means is identical to a turning direction of the semi-circular coupling segments.

* * * * *